Feb. 12, 1957  A. P. HENRY  2,781,027
ROTARY ACTUATING DEVICE
Filed July 27, 1955
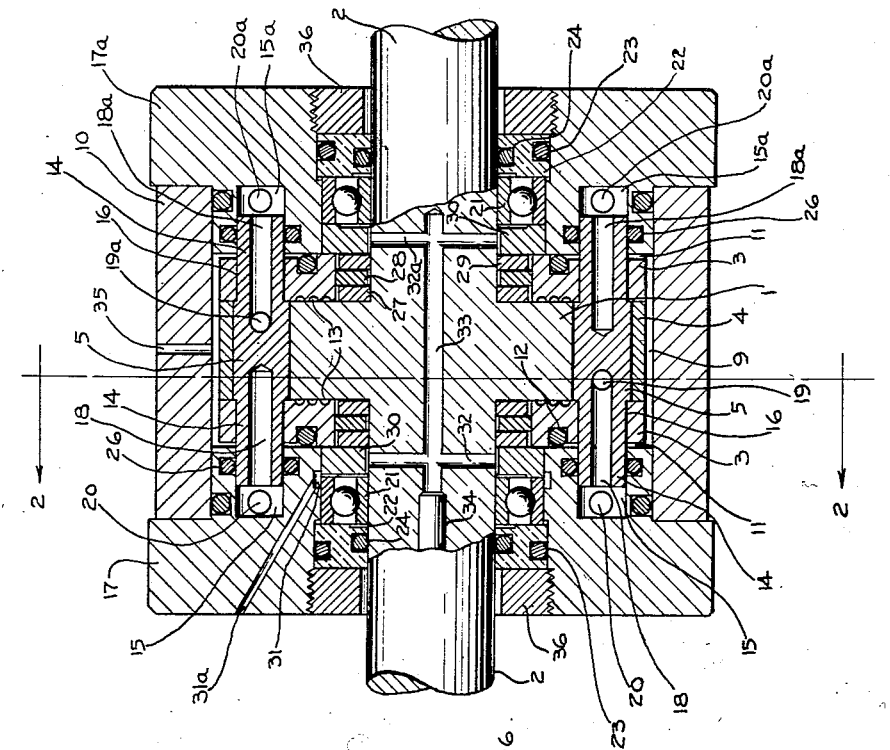
INVENTOR.
AUGUSTUS P. HENRY
BY
Augustus M. Henry
ATTORNEY

United States Patent Office

2,781,027
Patented Feb. 12, 1957

2,781,027

ROTARY ACTUATING DEVICE

Augustus P. Henry, Los Angeles, Calif., assignor to Control Specialists, Inc., a corporation of California Application July 27, 1955, Serial No. 524,766

20 Claims. (Cl. 121—97)

This invention relates to new and useful improvements in a rotary hydraulic power actuating device.

By a rotary hydraulic power actuating device, as that phrase is used herein, is means a fluid powered apparatus the output of which is rotational displacement of a shaft, which rotational displacement may occur at a very high torque level. The rotational displacement, and higher time derivatives, that is for example rotational velocity, acceleration and so on, are controlled by admitting properly modulated flow of pressurized fluid to one or more chambers of variable volume contained within the structure of the device while simultaneously allowing pressurized fluid to flow out of one or more additional chambers likewise contained within the structure. These latter chambers are isolated from the first mentioned chambers.

The power medium in this instance is the pressurized fluid which is supplied by an outside agent. The fluid can be either a compressible gas or vapor or a relatively incompressible liquid, as for example a mineral base oil. Neither the outside agent which supplies the pressurized power medium nor the valving mechanism which modulates the flow to and from the actuator chambers of variable volume is of concern in the present invention.

The present invention is of utility in connection with power transmission applications where limited angular output motion or displacement is desired, as for example in aircraft nosewheel steering, aircraft primary control surface actuation, position control of radar antennae, position control of gun turrets and the like.

In power transmission appliances of the kinds last mentioned, especially in the case of aircraft primary control surface actuation, a linear or ram type actuator is generally used, acting through a bell-crank to produce rotary motion. The pin joints then required are prime sources of backlash or lost motion. Backlash in a closed loop servo is a nonlinearity (in the mathematical sense) which tends to produce a limit cycle oscillation, thereby to give a condition of hunting or instability about an operating point. Consequently, the use of a rotary hydraulic (or pneumatic) actuator is inherently attractive as a power output device in numerous applications. Yet prior to this present invention, so far as I am aware, there existed no configuration which was completely satisfactory for use at supply line pressures greater than, say, 1500 p .s. i. At supply line pressures higher than 1500 p. s. i. the internal leakage within the actuator itself becomes excessive for many applications. Even more significant in some cases is the high static breakaway (coulomb) friction in the conventional design.

In connection with the first-mentioned disadvantage, that is, the excessive internal leakage within the actuator itself, consider a rotary actuator of conventional design consisting of a double vaned rotor, two stationary fluid barriers, two side plate sealing members, and an outer ring in intimate sealing contact with the rotor vanes; said outer ring material being steel. If, for example, the inside diameter of the sealing ring is 2.50 inches and the ring is 0.50 inch thick, the radial expansion of the ring is approximately 0.00015 inch per 1000 p. s. i. of internal pressure, when said internal pressure exists uniformly and continuously around the inner periphery of the ring, or when said internal pressure level exists uniformly and equally in each of the say four internal chambers contained within the structure. For a condition of no load imposed on the actuator, the pressure level existing in said chambers are all equal one to another; this common pressure level, when conventional valving means are employed, being equal to one half the magnitude of the supply line pressure, where all pressures are measured relative to return line pressure with the latter assumed to be zero with reference to ambient atmosphere.

Present practice in aircraft installation, as an example, favors the use of supply line pressures of 3000 p. s. i. and in certain instances in this country and more frequently abroad pressures of 4000 p. s. i. and higher are used. Assuming a supply line pressure of 3000 p. s. i. and a condition of no load imposed on the actuator while under control of a conventional four way valve, there exists a pressure of 1500 p. s. i. uniformly within and throughout each of the four chambers contained within the structure. Thus the radial expansion of the outer sealing ring is approximately 0.000225 inch, or 0.00045 inch ring diameter increase. Additive to this is the clearance normally required for assembly of the device, which additive clearance results in a diametral leakage clearance in excess of 0.0006 inch. Clearance of such magnitude is excessive where internal leakage control is a design consideration of importance.

Consider now the case where a load is applied to the actuator, with the latter, for example, having four internal actuator chambers spaced around the longitudinal center-line of rotor and power output shaft. Consequent upon said load, there is an increase of the pressures in the two chambers occupying a pair of quadrants which relative to said center-line are diametrically opposite, while simultaneously there is a decrease of the pressures existing in the remaining two chambers occupying the complementary diametrically opposite pair of quadrants; the increase in pressure level in the first mentioned pair of chambers being precisely equal in magnitude to the decrease in pressure level in the last mentioned pair of chambers. The difference in pressure level existing between the chambers of higher pressure and the chambers of lower pressure is proportional to and is a measure of the load seen by the actuator. Under such conditions the radial expansion of the outer sealing ring is no longer uniform about its periphery. This non-uniform pressure loading around the internal surface of the ring causes the ring to deform in an egg-shaped or elliptical manner. Departure of the actuator rotor from its mid-stroke position intensifies the severity of the elliptical deformation in the ring and further aggravates the problem of internal leakage control.

Another inherent disadvantage of the conventional rotary actuator is the high degree of structural redundancy within and throughout the basic structure. This in conjunction with heavy loading imposed on the output shaft contributes to the static breakaway friction which is so objectionable in a rotary actuator of conventional configuration.

The primary object of the present invention is to provide a rotary fluid powered actuator configuration wherein pressure induced sealing ring deformation does not result in increased clearance between the several internal sealing elements.

A further object of the invention is to provide a rotary fluid powered actuator configuration wherein structural redundancy is reduced to a minimum through the elimination of unnecessary restraints imposed on the several coacting elements.

A still further object of the invention is to provide a device which is capable of reduction to a specific design by persons skilled in the particular arts which are applicable, which design configuration shall be readily producible by known and accepted fabrication techniques.

Other objects, features and advantages of the invention will be pointed out or become apparent hereinafter.

In exemplification but not in limitation of the invention, a now preferred embodiment thereof is shown in the accompanying drawing, in which—

Fig. 1 is mainly a section taken substantially on the line 1—1 of Fig. 2, with the power output shaft partially shown in side elevation; and Fig. 2 is a section taken substantially on the line 2—2 of Fig. 1.

A cursory examination of the drawing discloses the basic configuration of the illustrative embodiment there shown to consist of a double lobed or vaned rotor 1 integral with a power output shaft 2, two pressure loaded side plates 3, a pressurized seal ring 4, two lapped rotary seals which seals are comprised of a multiplicity of coacting annular elements, two fluid isolator barriers 5, a pair of ball bearings, a number of O-ring sealing members, and an appropriate structural housing.

The configuration so shown is that of a double vane rotary actuator in which the radial loads are approximately in balance. Thus four pressurized chambers exist within the active portion of the structure. Chambers designated 6 in Fig. 2, and there further marked $P_1$, are interconnected by means of conduits not shown which communicate with one of two control ports of a conventional four way valve not shown. Similarly, chambers designated 7 in Fig. 2, and there further marked $P_2$, are interconnected by means of conduits not shown which communicate with the second control port of the four way valve. Thus as pressurized fluid is valved into chambers 6, for example, said chambers must increase in volume while simultaneously chambers 7 experience an equivalent decrease in volume. Such action is accompanied by rotation of the rotor and the output shaft, which latter is fixedly connected to the rotor. Said rotation is in a counter-clockwise direction.

In connection with the above described construction it is pointed out herein that the method of fixedly securing output shaft 2 and rotor vanes 8 to the rotor 1 is of no concern in the present invention. That is, the construction may be integral one part to another as shown in the drawing or the construction may utilize several separate members held in proper geometrical relationship by such structural securing means as may be applicable. For example, a configuration having a single vane, a single fluid isolator barrier 5 and a single $P_1$ chamber with its complementary single $P_2$ chamber is equally applicable under the present invention.

The $P_1$ and $P_2$ chambers 6 and 7 are formed by the double vaned rotor 1, the pressurized seal ring 4, the two pressure-loaded side plates 3 and the two fluid isolator barriers 5.

A key feature of the present invention is the provision of an annular chamber 9 which surrounds the outer periphery of the pressurized seal ring 4. Said annular chamber is formed by the outer circular surface of the pressurized seal ring 4 and the outer structural casing 10. Contiguous with the annular chamber 9 along the outboard surfaces of the two pressure loaded side plates 3 there exist shallow chambers 11 adjacent to relieved portions of said pressure loaded side plates. Chambers 11, also, are annular, and these chambers extend radially inward over the full outboard surfaces of the side plates to the inner diameters of the O-ring static seal members 12.

Annular chambers 9 and the side chambers 11 in open communication therewith as clearly seen in Fig. 1 are supplied with fluid at a pressure level which may be some fixed fraction of supply pressure, or said pressure level may be variable as for example a function of load induced pressure. For a supply pressure of 3000 p. s. i., the pressure in chamber 9 and in chambers 11 can for example be constant at 1500 p. s. i. Said pressure in chambers 9 and 11 can be supplied by an outside agent.

The configuration so described and as illustrated in the drawing is such that the thus pressurized side plates are pressure loaded by way of the annular chambers 11 so as to maintain positive intimate sealing contact with the flat end surfaces of the seal ring 4.

The pressure existing in the annular chamber 9 around the outer periphery of the relatively thin-walled seal ring 4 results in essentially zero change in radial expansion of said seal ring at points adjacent to the rotor vanes 8 and at points adjacent to the stationary fluid isolator barriers 5. At places remote from these points around the periphery of seal ring 4 radial expansion of said ring is of no consequence.

This important feature of control of the radial clearance at the critical points where fluid seal must be effected is best understood by considering the actuator under severe loading conditions at 3000 p. s. i. supply pressure and with annular chamber 9 subjected to a constant static pressure of 1500 p. s. i.

Under such conditions the pressure $P_1$ existing in chambers 6, for example, will be 1500 p. s. i. plus some incremental pressure increase which will be a linear (porportional) function of the load seen by the actuator. Similarly the pressure $P_2$ existing in chambers 7 will be 1500 p. s. i. less an incremental pressure decrease which will be precisely equal in magnitude to the aforesaid incremental increase in chambers 6, assuming throughout that a conventional four way valve is used as a valving means and that a relatively incompressible fluid is used, as in a so-called hydraulically controlled device.

The pressure $P_1$ existing in chambers 6, being greater by the magnitude of the incremental increase in pressure in said chambers than the pressure existing in annular chamber 9, tends to expand the seal ring 4 radially outward over that portion of the arc exposed to said pressure $P_1$. Similarly the pressure $P_2$ existing in chambers 7, being less, by the magnitude of the incremental decrease of pressure in said chambers (said incremental decrease of pressure being as aforesaid precisely equal to said incremental increase of pressure in chambers 6), than the pressure existing in annular chamber 9, tends to collapse the seal ring 4 radially inward over that portion of the arc exposed to said pressure $P_2$. Regardless of the magnitudes of the incremental pressure changes in chambers 6 and 7, there exist points adjacent to the rotor vanes 8 and the fluid isolator barriers 5 at each of which there is a zero pressure differential between the local pressure inside the seal ring 4 tending to expand said ring radially outward and the pressure existing in annular chamber 9 tending to collapse said seal ring radially inward. At or very near the aforementioned points are nodal or inflection points of zero radial displacement of the seal ring 4.

It is seen that the seal ring 4 is in reality a continuous curved beam subjected to uniform pressure loadings over portions of its length; which uniform pressure loading, while continuous and constant over the outer periphery of the ring, is discontinuous over the inner periphery of the ring but uniform over portions of said inner periphery. Thus, unlike the conventional configuration where sealing at the critical points must be minimized by making the outer seal ring heavy and rigid in order to minimize radial deflection of said ring, the configuration of the present invention is such that sealing at the critical points is enhanced by making the seal ring 4 thin and relatively flexible.

The seal ring 4 is lapped or otherwise treated to a high degree of surface finish refinement along its inner peripheral surface and along its two end surfaces, which end surfaces are flat and parallel. Said inner peripheral surface being circular in a plane normal to the center-line of the seal ring, and every line element of said inner peripheral surface being parallel to any other line element thereof and to said center-line, and every line element having a high degree of straightness, said inner peripheral surface constitutes a nearly perfect cylindrical surface. The pressure loaded side plates 3 are similarly lapped to a high degree of surface finish refinement on their flat inner surfaces; which surfaces are in intimate sealing contact with the flat and parallel end surfaces of seal ring 4, the flat and parallel end surfaces of the rotor 1, the flat and parallel end surfaces of the rotor vanes 8, and the flat and parallel (pie-shaped) end surfaces of the fluid isolator barriers 5. Also, all the last above mentioned flat surfaces of the ring 4, the rotor 1, the rotor vanes 8, and the fluid isolator barriers 5, are likewise lapped to a high degree of surface finish refinement.

As illustrated in Fig. 1, the pressure loaded side plates 3 are provided with a series of annular concentric grooves 13, the outermost groove being of a diameter somewhat smaller than the diameter of the rotor 1 so as not to permit a fluid short circuit from chambers 6 to chambers 7. These annular concentric grooves serve to balance the pressure around the sealing surfaces involved in the manner well known in the hydraulics art. A further purpose in providing the annular concentric grooves 13 is to reduce appreciably the surface area of the inner faces of the pressure loaded side plates 3 in the region so affected. Thus, in the flat lapping process, the inner surfaces of the pressure loaded side plates 3 become slightly concave as the lapping process removes material proportionately as there is diminution, due to the presence of said grooves, of the surface area presented to the abrasively charged lapping plate. Said concavity ensures, in the final assembly of the device, an initial and positive linear contact over the full circular arc between the two side plates 3 and the flat and parallel end surfaces of the seal ring 4.

The rotor 1 is lapped to a high degree of surface finish refinement on its circular surfaces which extend between the vanes 8 and form portions of the fluid boundaries of the $P_1$ and $P_2$ chambers 6 and 7, as well as on the flat side surfaces of said rotor as mentioned previously. Likewise the radially outermost cylindrical surfaces of the rotor vanes 8, which surfaces are in intimate sealing relationship with the lapped inner cylindrical surface of the seal ring 4, are lapped to a high degree of surface finish refinement, as are the flat and parallel end surfaces of said vanes also as previously mentioned.

The fluid isolator barriers 5 are lapped to a high degree of surface finish refinement on their flat (pie-shaped) and parallel end surfaces as previously mentioned and at their inner and outer cylindrically curved surfaces; to insure intimate sealing relationship of said outer cylindrically curved surfaces of said barriers with the lapped inner cylindrical surface of seal ring 4, and also to insure intimate sealing relationship of said inner cylindrically curved surfaces of said barriers with the cylindrical surface of rotor 1.

Shown as integral with the fluid isolator barriers 5 are pins 14 symmetrically in longitudinal extension therefrom. Said pins are lapped to a high degree of surface finish refinement and are fitted in intimate sealing relationship with holes 16 in the pressure loaded side plates 3.

Said holes 16 in the pressure loaded side plates 3 are similarly lapped to a high degree of surface finish refinement, all these holes being parallel to each other and to the longitudinal center-line of the actuator assembly. Said holes are located in the side plates 3 so as receptively to accommodate the pins 14 substantially as shown in Fig. 2.

Pins 14 extend axially through the pressure loaded side plates 3 into receptively located blind bores 15 and 15a located respectively in structural end cap 17 and in structural end cap 17a. Around each pin 14 where extended into its receptive blind bore 15 a static O-ring sealing member 26 is provided, to prevent fluid leakage from the cavity existing in a blind bore 15 beyond the pin 14 therein, to the nearby chamber 11, and/or to prevent fluid leakage from the cavity existing in a blind bore 15a beyond the pin 14 therein, to the nearby chamber 11; which chambers 11, as has already been pointed out, are at the relieved portions of the outer surfaces of the pressure loaded side plates 3.

Drilled longitudinally of the pins 14 on one side of the device (the left side of the device as seen in Fig. 1) are holes 18. These holes 18 connect respectively through holes 19 to actuator chambers 6; the center lines of holes 19 being perpendicular to and intersecting the center lines of holes 18. Similarly, the pins 14 on the side of the device to the right in Fig. 1 have longitudinally drilled holes 18a, said holes not being in fluid communication with holes 18. These holes 18a connect respectively through holes 19a (one only of which, of course, is seen in Fig. 1) to actuator chambers 7; the center lines of said holes 19a being perpendicular to and intersecting the center lines of the holes 18a. Holes 19 and 19a are drilled respectively from the the oppositely located flat rectangular surfaces of each fluid isolator barrier 5, said holes being out of fluid communication one with another.

Drilled passageways 20 and 20a, said passageways consisting each of a single drilled hole or a multiplicity of appropriately intersecting drilled holes within the corresponding end cap 17 or 17a, connect respectively to the two control ports of the aforesaid non-shown four-way valve.

Thus the fluid connection is from what may be called the $P_1$ control port of said four way valve through the connecting passageways 20, located in end cap 17, the cavities 15, thence through the drilled holes 18 in the pins 14 at the left in Fig. 1, and thence through the drilled holes 19 in the fluid isolator barriers 5 into the two chambers 6 of variable volume within the actuator active structure. Similarly the coacting fluid connection is from what may be called the $P_2$ control port of said four way valve through the connecting passageways 20a located in end cap 17a, to the cavities 15a, thence through the drilled holes 18a in the pins 14 at the right in Fig. 1, and thence through the drilled holes 19a in the fluid isolator barriers 5 into the two chambers 7 of variable volume within the actuator active structure. In this connection it is pointed out that the conduits shown as comprised of the drilled passageways 20 and 20a may be comprised partially of tubing and plumbing external of the actuator structure and external of end caps 17 and 17a.

Referring to Fig. 1, it is seen that rotor 1 and shaft 2, said shaft being shown as integral with said rotor, are supported radially by means of two ball bearings 21; which ball bearings are located in receptive bores in end caps 17 and 17a. Outboard of each ball bearing is a spacer bushing 22, which spacer bushing is provided with an annular groove in its outer periphery for reception of an O-ring 23. With respect to each of the two said spacer bushings 22, said O-ring 23 in conjunction with its said annular receiving groove constitutes a fluid static seal for the prevention of fluid leakage from the interior of the actuator structure around the outer periphery of said spacer bushing. In addition each spacer bushing is provided with an annular groove in its inner periphery; which annular groove is for reception of an O-ring 24. Said O-ring 24 in conjunction with its said receiving annular groove constitutes a fluid rotary seal for the prevention of fluid leakage from the interior of the actuator structure between the rotatable shaft 2 and the inner periphery of said spacer bushing. In connection with said fluid rotary seal, it must be pointed out that the shaft 2 in the vicinity of the fluid rotary seal is provided with a high degree of surface finish refinement.

Each spacer bushing 22, it will be noted, is fixedly retained in proper longitudinal relationship to the structure by means of a securing nut 36 threaded into the end cap 17 or 17a in which said spacer bushing is contained.

In order to minimize static breakaway friction it is a desideratum that such a rotary shaft seal as one incorporating the O-ring 24 as just described utilize an O-ring with minimum squeeze and particularly that the said rotary shaft seal be subjected to a very small pressure differential. (In connection with the said rotary shaft seal it is at the same time pointed out that a seal configuration other than the O-ring seal described may be equally adaptable.)

Minimization of static breakaway friction is accomplished by providing at each side of the rotor 1, in addition to the rotary shaft seal incorporating an O-ring 24 or equivalent at that side of the rotor, a primary sealing means at a location internal of said rotary shaft seal, that is, at a location inboard of said rotary shaft seal and between the latter and the rotor.

Referring to Fig. 1, each of said sealing means is herein shown as comprising three lapped washers 27, 28 and 29 located within a central bore included in a pressure loaded side plate 3, and parallel to the flat sealing surface of said plate an appropriate spacer ring 30 is located between each bearing 21 and the outermost one of the adjacent group of said three lapped washers 27, 28 and 29.

All said lapped washers are lapped to a high degree of surface finish refinement on their flat and parallel side surfaces to insure an intimate sealing relationship as between the flat surface of one washer and the meeting flat surface of an adjacent washer.

In the case of each of the said two internal sealing means, the washer 27 presents its flat inboard surface to the flat lapped side surface of rotor 1; the meeting flat surfaces of these two coacting members being in intimate sealing relationship and thereby mutually forming a fluid seal. Similarly, the flat outboard surface of washer 27 is in intimate sealing relationship with the flat inboard surface of washer 28; the flat outboard surface of washer 28 is in intimate sealing relationship with the flat inboard surface of washer 29, and the flat outboard surface of washer 29 is in intimate sealing relationship with the flat inboard surface of spacer ring 30, which latter surface is also lapped to a high degree of surface finish refinement.

The central bore of each pressure loaded side plate 3 is lapped to a high degree of surface finish refinement, to insure an intimate sealing relationship as between said bore and the outer peripheral surface of the lapped washer in said bore, which said peripheral surface of said washer 28 is also lapped to a high degree of surface finish refinement. It will be noted that the inner diameter of washer 28 is somewhat larger, as is the inner diameter of spacer ring 30, than the diameter of the output shaft 2.

The washer 29 at its inner diameter is lapped to a high degree of surface finish refinement, to insure an intimate sealing relationship as between the same and the output shaft 2, which shaft is also lapped to a high degree of surface finish refinement in the region of its engagement with the washer 29. It will be noted that the outer diameter of washer 29, as is the outer diameter of washer 27, is somewhat smaller than the diameter of the central bores of the pressure loaded side plates 3.

The washers 27 may be of identical configuration with the washers 29, although it is not necessary that the inner peripheral surface of either washer 27 be in intimate sealing relationship with rotor shaft 2.

The composite and aggregate sum of the thicknesses of the group of washers 27, 28 and 29 contained in each pressure loaded side plate 3 is less by a very small but finite amount than the thickness of said plate, or less than the axial length of the central bore in said plate. Such provision ensures the washers a degree of radial freedom, one washer relative to another or one or more washers relative to other structural members, which degree of freedom does not result in deterioration of effectiveness of the composite fluid rotary seal.

The fluid rotary seal formed substantially as hereinabove described is capable of accommodating a considerable degree of eccentricity of the rotor shaft relative to other structural members.

The main sealing, it will be noted, is accomplished by the primary sealing means aforesaid, that is, the pair of lapped rotary seals each exemplified in the construction shown in the drawing by one of the two like groups of lapped washers 27, 28 and 29. Therefore, O-ring seals may be located outboard of said lapped rotary seals, and said O-ring seals as thus located (e. g., the O-seals 24) can be of minimum squeeze and subjected to a small pressure differential, to minimize coulomb friction. The composite configuration of each lapped rotary seal (e. g., the washers 27, 28 and 29) forms a lapped labyrinth seal, and, moreover, one which is capable, as pointed out in the paragraph immediately hereinabove, of accommodating a considerable degree of eccentricity of the rotor shaft relative to other structural members.

The small amount of fluid leakage which passes the fluid rotary seal is collected in annular groove 31 and is drained off through fluid conduit 31a to return, which return pressure is essentially zero relative to ambient atmospheric pressure. As shown in Fig. 1, both lapped rotary seals which are located in the respectively opposite sides of rotor 1, are fluidly interconnected at their downstream sides to a common drain connection through said annular groove 31 and said conduit 32 in conjunction with a multiplicity of intersecting drilled holes in the output shaft 2. Said multiplicity of intersecting drilled holes includes a drilled blind hole 33 extended longitudinally of output shaft 2. Radially drilled holes 32 and 32a, also located in said shaft, intersect the longitudinally drilled hole 33, with the combination of drilled holes constituting a communicative fluid contact between the downstream sides of both lapped rotary seals. Sealing plug 34 prevents external leakage from said communicative fluid conduit.

A fluid conduit 35, consisting of a fluid admission point through the outer structural casing 10 together with external tubing, serves as a means for introducing pressurized fluid to chambers 9 and 11.

The rotary actuator configuration illustrated and described in detail herein is of a type which is particularly insensitive to loading effects. Said loading may be applied either torsionally or longitudinally to the output shaft 2. Under longitudinal (thrust) loading the load reaction is supplied by the surface of the pressure loaded side plate 3 acting against the corresponding flat side surface of the rotor 1 through a thin film of pressurized fluid existing between said surfaces. Under all operating conditions a small but finite leakage flow passes between said surfaces. Therefore a definite radial pressure gradient exists in the fluid film between the coacting surfaces. As a load is applied operating to squeeze said fluid film, the pressure existing in said fluid film increases such that the integral of pressure increase over the area involved is equivalent to the longitudinal thrust load applied. The word "integral" as used in the above connection is in the mathematical sense.

As regards the effects of torsionally applied loads, which torsionally applied loads are reflected by a pressure differential as between a pressure $P_1$ in chambers 6 and a pressure $P_2$ in chambers 7, the elimination of all unnecessary structural restraints of one member relative to another results in a very low level of static breakaway friction. The complete active assembly, consisting of rotor 1, pressure loaded side plates 3, outer seal ring 4 and the fluid isolator barriers 5, is radially displaceable within the limits of the difference in diameter of the blind bores 15 over the diameter of the pins 14. In this connection it is further pointed out that it is possible radially to enlarge blind bores 15 so as to accommodate considerable radial displacement if so desired.

There is no restraint on the outer seal ring 4 in the rotational sense. Additionally, because the fluid isolator barriers 5 are not secured in any way to the seal ring 4, as in contrast with a conventional design wherein said barriers are integral with said ring or fixedly attached thereto, pressure loading on said barriers results in no additional bending moment applied to said ring.

As has been indicated, only one of the several possible embodiments of the present invention has been shown and described. This has been treated with considerable particularity of detail, not for the purpose of limitation, but to illustrate the capabilities of the invention. As will be understood, variations and modifications are possible, and certain features may be used without others. The scope of protection contemplated is to be taken from the appended claims interpreted as broadly as is consistent with the prior art.

I claim:

1. A rotary hydraulic power actuating device comprising, in combination, a rotor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, the casing internally thereof being shaped and dimensioned whereby with said ring installed an annular chamber is established in the casing the inner wall of which is constituted by the outer periphery of the ring, and means for admitting fluid under pressure to said annular chamber.

2. A rotary hydraulic power actuating device comprising, in combination, a motor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, the casing internally thereof being shaped and dimensioned whereby with said ring installed an annular chamber is established in the casing the inner wall of which is constituted by the outer periphery of the ring, the casing internally thereof being further shaped and dimensioned to provide two further annular chambers each substantially parallel to said side plates and each outboard of a different one of said plates, and means for admitting fluid under pressure to said three annular chambers.

3. A rotary hydraulic power actuating device comprising, in combination, a motor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, the casing internally thereof being shaped and dimensioned whereby with said ring installed an annular chamber is established in the casing the inner wall of which is constituted by the outer periphery of the ring, the casing internally thereof being further shaped and dimensioned to provide two further annular chambers each substantially parallel to said side plates and each outboard of a different one of said side plates, the two second-named annular chambers opening into the first-named annular chamber, and means for admitting fluid under pressure to one of said annular chambers.

4. A rotary hydraulic power actuating device comprising, in combination, a rotor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, said barriers having passageways therethrough, and said ingress and egress means including said passageways.

5. A rotary hydraulic power actuating device comprising, in combination, a rotor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, the casing internally thereof being shaped and dimensioned whereby with said ring installed an annular chamber is established in the casing the inner wall of which is constituted by the outer periphery of the ring, and means for admitting fluid under pressure to said annular chamber, whereby the pressure of the fluid in said annular chamber may be maintained at a sufficiently high level to assure optimum liquid tight seal between said ring and said rotor vane and also between said ring and said fluid isolating barrier by preventing a cylindrical deformation of said ring in response to differing fluid pressures in the two first-named chambers from increasing the radial clearance of said ring at points adjacent to said rotor vane and adjacent to said fluid isolating barrier, there being further sealing means for insuring optimum liquid tight seal relative to said two first-named chambers, said further sealing means including two lapped rotary seals each comprising a group of lapped washers, the rotor shaft extending beyond opposite sides of the rotor, said side plates being annular, said seals being surrounded each by a different one of said side plates, and each of said seals having one of the washers thereof at its external periphery in engagement with the internal periphery of the adjacent side plate and having another washer thereof at its internal periphery in engagement with the rotor shaft.

6. A rotary hydraulic power actuating device comprising, in combination, a rotor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, the casing internally thereof being shaped and dimensioned whereby with said ring installed an annular chamber is established in the casing the inner wall of which is constituted by the outer periphery of the ring, and means for admitting fluid under pressure to said annular chamber whereby the pressure of the fluid in said annular chamber may be maintained at a sufficiently high level to assure optimum liquid tight seal between said ring and said rotor vane and also between said ring and said fluid isolating barrier by preventing a cylindrical deformation of said ring in response to differing fluid pressures in the two first-named chambers from increasing the radial clearance of said ring at points adjacent to said rotor vane and adjacent to said fluid isolating barrier, there being further sealing means for insuring optimum liquid tight seal relative to said two first-named chambers, said further sealing means incorporating a chamber in the casing lying outboard of one of said side plates whereby on admission of fluid under pressure to the last-named chamber the last-named side plate can be forced by said pressure to optimum liquid tight engagement with said ring and with a side of the rotor.

7. A rotary hydraulic power actuating device comprising, in combination, a rotor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, the casing internally thereof being shaped and dimensioned whereby with said ring installed an annular chamber is established in the casing the inner wall of which is constituted by the outer periphery of the ring, and means for admitting fluid under pressure to said annular chamber whereby the pressure of the fluid in said annular chamber may be maintained at a sufficiently high level to assure optimum liquid tight seal between said ring and said rotor vane and also between said ring and said fluid isolating barrier by preventing a cylindrical deformation of said ring in response to differing fluid pressures in the two first-named chambers from increasing the radial clearance of said ring at points adjacent to said rotor vane and adjacent to said fluid isolating barrier, there being further sealing means for insuring optimum liquid tight seal relative to said two first-named chambers, said further sealing means including an outboard rotary shaft seal incorporating an O-ring of minimum squeeze and an inboard lapped rotary seal comprising a group of lapped washers one of which is of less internal diameter than another.

8. A rotary hydraulic power actuating device comprising, in combination, a rotor casing, a rotor therein, a power output shaft fixedly carrying the rotor, a vane fixedly carried by the rotor, a fluid isolating barrier fixedly positioned in the casing, a seal ring in the casing, a pair of side plates in the casing and between which is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, the casing internally thereof being shaped and dimensioned whereby with said ring installed an annular chamber is established in the casing the inner wall of which is constituted by the outer periphery of the ring, and means for admitting fluid under pressure to said annular chamber whereby the pressure of the fluid in said annular chamber may be maintained at a sufficiently high level to assure optimum liquid tight seal between said ring and said rotor vane and also between said ring and said fluid isolating barrier by preventing a cylindrical deformation of said ring in response to differing fluid pressures in the two first-named chambers from increasing the radial clearance of said ring at points adjacent to said rotor vane and adjacent to said fluid isolating barrier, there being further sealing means for insuring optimum liquid tight seal relative to said two first-named chambers, said further sealing means including an outward rotary shaft seal incorporating an o-ring of minimum squeeze and an inboard lapped rotary seal comprising a group of lapped washers one of which is of less internal diameter than another and one of which is of greater external diameter than another.

9. A rotary hydraulic power actuating device comprising, in combination, a rotary casing, a rotor therein, a power output shaft fixedly carrying the rotor, a vane fixedly carried by the rotor, a fluid isolating barrier fixedly positioned in the casing, a seal ring in the casing, a pair of side plates in the casing, between which said plates is interposed said ring for flatwise engagement of said plates with the opposite sides of said ring and also with the opposite sides of the rotor, said ring at its internal periphery engaging the outermost cylindrical surface or line element thereof of the vane and the outermost cylindrical surface or line element thereof of said barrier and the rotor beyond said vane peripherally engaging the inner cylindrical surface or line element thereof of said barrier thereby to provide a pair of chambers each bounded by the rotor, said ring, said vane and said barrier but separated one from another by said vane and also by said barrier, an ingress means for flow of fluid under pressure into one of said chambers, an egress means for flow of fluid under pressure out of the other of said chambers, and means for draining off such fluid as leaks from either of said pair of chambers, there being a passageway in the rotor shaft and the means last-named including said passageway.

10. A rotary hydraulic power actuating device comprising, in combination, a rotor, a power output shaft fixedly carrying the rotor, a casing including internal parts having surfaces coacting to define a compartment wherein the rotor is rotationally disposed and for establishing a plurality of chambers for the reception and discharge of pressurized fluid, sealing means including a vane fixedly carried by the rotor and also including a barrier fixed in the casing and projected into said compartment for fluidly isolating one of said chambers from the other, the casing also having internal parts carrying a bearing for the power output shaft, and further sealing means incorporating a lapped rotary seal comprising a group of lapped washers sleeving the power output shaft inboard of said bearing.

11. A rotary hydraulic power actuating device comprising, in combination, a rotor, a power output shaft fixedly carrying the rotor, a casing including internal parts having surfaces coacting to define a compartment wherein the rotor is rotationally disposed and for establishing a plurality of chambers for the reception and discharge of pressurized fluid, sealing means including a vane fixedly carried by the rotor and also including a barrier fixed in the casing and projected into said casing for fluidly isolating one of said chambers from the other, the casing also having internal parts carrying a bearing for the power output shaft, further sealing means incorporating a lapped rotary seal comprising a group of lapped washers sleeving the power output shaft inboard of said bearing, and means adjustable from the exterior of the casing to force a side plate toward a predetermined pressure flatwisely against said seal ring, there being means constituted by a groove-including shape of each said plate whereby, consequent upon said plates having been so made as to have their fabrication include a lapping to a high degree of surface finish refinement, a plate incorporates a concavity facilitative of optimum liquid tight seal between said ring and said plate, when the latter is subjected to said predetermined pressure by the means last-named.

12. A rotary hydraulic power actuating device comprising, in combination, a rotor, a power output shaft fixedly carrying the rotor, a casing including internal parts having surfaces coacting to define a compartment wherein the rotor is rotationally disposed and for establishing a plurality of chambers for the reception and discharge of pressurized fluid, sealing means including a vane fixedly carried by the rotor and also including a barrier fixed in the casing and projected into said compartment for fluidly isolating one of said chambers from the other, said internal casing parts including two annular side walls, said power output shaft having lengths extending in opposite directions from opposite sides of the rotor, the casing further having internal parts carrying bearings one for each of said shaft lengths, and further sealing means incorporating a pair of lapped rotary seals each comprising a group of lapped rotary seals and each sleeving one of said shaft lengths inboard of said bearings, each of said rotary seals being sleeved by a different one of said annular walls.

13. A rotary hydraulic power actuating device comprising, in combination, a rotor casing, a rotor therein having a pair of vanes one diametrically opposite the other, said rotor casing including parts shaped and arranged so that surfaces thereof combine to provide a rotor accommodating compartment, means for subdividing said compartment into four actuating chambers, said chambers, consisting of two chambers of variable volume each adapted to store a fluid pressurized at $P_1$ and two chambers also of variable volume and each adapted to retain fluid of the same kind pressurized at $P_2$ wherein the then existent load induced pressure is reflected by a proportional difference of pressure at $P_1$ relative to pressure at $P_2$, said means including said vanes and a pair of spaced fluid isolating barriers one diametrically opposite the other, said barriers fixedly carried by the casing within the device, a power output shaft intermediate the length thereof carrying said rotor, said casing included parts including a seal ring having portions respectively constituting the outermost walls of said chambers, two side plates each having portions respectively constituting the opposite side walls of said chambers, and means for pressure loading said ring and said side plates.

14. A rotary hydraulic power actuating device comprising, in combination, a rotor casing, a rotor therein having a pair of vanes one diametrically opposite the other, said rotor casing including parts shaped and arranged so that surfaces thereof combine to provide a rotor accommodating compartment, means for subdividing said compartment into four actuating chambers, said chambers consisting of two chambers of variable volume each adapted to store a fluid pressurized at $P_1$ and two chambers also of variable volume and each adapted to retain fluid of the same kind pressurized at $P_2$ wherein the then existent load induced pressure is reflected by a proportional difference of pressure at $P_1$ relative to pressure at $P_2$, said means including said vanes and a pair of spaced fluid isolating barriers one diametrically opposite the other, said barriers fixedly carried by the casing within the device, a power output shaft intermediate the length thereof carrying said rotor, said casing included parts including internally of the casing a seal ring and two side plates, the casing parts being so arranged and disposed that each of said four chambers is substantially a duplicate of all the others under no load and at a midstroke condition of the device, the casing internally thereof being shaped and dimensioned to provide an annular chamber the inner wall of which is constituted by the outer periphery of said ring, and means for admitting fluid under pressure to said annular chamber.

15. A rotary hydraulic power actuating device comprising, in combination, a rotor casing, a rotor therein having a pair of vanes one diametrically opposite the other, said rotor casing including parts shaped and arranged so that surfaces thereof combine to provide a rotor accommodating compartment, means for subdividing said compartment into four actuating chambers, said chambers consisting of two chambers of variable volume each adapted to store a fluid pressurized at $P_1$ and two chambers also of variable volume and each adapted to retain fluid of the same kind pressurized at $P_2$ wherein the then existent load induced pressure is reflected by a proportional difference of pressure at $P_1$ relative to pressure at $P_2$, said means including said vanes and a pair of spaced fluid isolating barriers one diametrically opposite the other, said barriers fixedly carried by the casing within the device, a power output shaft intermediate the length thereof carrying said rotor, said casing included parts including internally of the casing a seal ring and two side plates, the casing parts being so arranged and disposed that each of said four chambers is substantially a duplicate of all the other under no load and at a midstroke condition of the device, the casing internally thereof being shaped and dimensioned to provide an annular chamber the inner wall of which is constituted by the outer periphery of said ring, the casing internally thereof being further shaped and dimensioned to provide two further annular chambers substantially parallel to said side plates and each outboard of a different one of said side plates, and means for admitting fluid under pressure to said three annular chambers.

16. A rotary hydraulic power actuating device as in claim 15, wherein each of said barriers has passageways therethrough, there being an ingress means for flow of fluid under pressure into two of the four first-named chambers and an egress means for flow of fluid under pressure out of two others of said four first-named chambers, said ingress and egress means including said passageways.

17. A rotary hydraulic power actuating device as in claim 15, wherein each of said barriers has passageways therethrough, and wherein an ingress means for one of the four first-named chambers includes a passageway in one of said barriers, an egress means for another of said four first-named chambers includes a passageway in the last-named barrier, an ingress means for still another of said four first-named chambers includes a passageway in the other barrier, and an egress means for the other of said four first-named chambers includes a passageway in the last-named barrier.

18. A rotary power actuating device as in claim 15, wherein each of said barriers has passageways therethrough, there being an ingress means for flow of fluid under pressure into two of the four first-named chambers and an egress means for flow of fluid under pressure out of two others of said four first-named chambers, said ingress and egress means including said passageways, the first-named two chambers being arranged in alternation with the second-named two chambers circumferentially of the rotor.

19. A rotary hydraulic power actuating device, comprising, in combination, a rotor casing, a rotor therein having a pair of vanes one diametrically opposite the other, said rotor casing including parts shaped and arranged so that surfaces thereof combine to provide a rotor accommodating compartment, means for subdividing said compartment into four actuating chambers, said chambers consisting of two chambers of variable volume each adapted to store a fluid pressurized at $P_1$ and two chambers also of variable volume and each adapted to retain fluid of the same kind pressurized at $P_2$ wherein the then existent load induced pressure is reflected by a proportional difference of pressure at $P_1$ relative to pressure at $P_2$, said means including said vanes and a pair of spaced fluid isolating barriers one diametrically opposite the other, said barriers fixedly carried by the casing within the latter, a power output shaft intermediate the length thereof carrying said rotor, said casing included parts including a seal ring having portions respectively constituting the outermost walls of said chambers, two side plates each having portions respectively constituting the opposite side walls of said chambers, and means for pressure loading said ring and said side plates, there being means outboard of both said side plates for coacting with said plates and with the power output shaft at opposite sides of the rotor for optimum fluid tight seal at said shaft, said means including a pair of lapped rotary seals each including two sealing washers peripherally and face lapped and facewisely engaging each other to provide a labyrinth seal so disposed and arranged as to be capable of accommodating a considerable degree of eccentricity of said power output shaft relative to other coacting and structural elements of the device.

20. In connection with a rotary hydraulic power actuating device incorporating a vaned rotor rotatable with which is a power output shaft and also incorporating a seal ring having an internal periphery of true cylindricity set in place to bound outwardly all of a plurality of actuating chambers spaced around the axis of rotation of the rotor, the method of operation of said device, wherein to save weight said seal ring is of such relatively small thickness that in view of the kind of metal componental thereof said ring would tend to become cylindrically deformed due to different internal hydraulic pressures respectively in different chambers proportional to and as a measure of the load at any particular time seen by the actuator and wherein said ring is also set in place to be outwardly bounded by a space inside said device, which involves introducing and maintaining in the said space a pressurized fluid at a pressure high enough to prevent any such cylindrical deformation of the seal ring from increasing the radial clearance of said ring at points adjacent a rotor vane and adjacent a fluid isolating barrier fixedly positioned in the device for coacting with a rotor vane in partially bounding an actuating chamber.

References Cited in the file of this patent
UNITED STATES PATENTS
2,524,682     Staude _____ Oct. 3, 1950